(12) United States Patent
Eck et al.

(10) Patent No.: US 12,071,220 B2
(45) Date of Patent: Aug. 27, 2024

(54) MECHANICAL GRIP INTERFACE FOR ACTIVE SIDE STICK

(71) Applicant: WITTENSTEIN SE, Igersheim (DE)

(72) Inventors: Alexander Eck, Kirchheim (DE); Andreas Lindner, Grünsfeld (DE); Matthias Schnupp, Weikersheim (DE); Christoph Prinz, Oberlauda (DE); Sebastian Michel, Wolkshausen (DE)

(73) Assignee: WITTENSTEIN SE, Igersheim (DE)

( * ) Notice: Subject to any disclaimer, the term of this patent is extended or adjusted under 35 U.S.C. 154(b) by 527 days.

(21) Appl. No.: 17/209,632

(22) Filed: Mar. 23, 2021

(65) Prior Publication Data

US 2021/0300524 A1 Sep. 30, 2021

(30) Foreign Application Priority Data

Mar. 25, 2020 (DE) .......................... 102020108223.1

(51) Int. Cl.
*B64C 13/04* (2006.01)
(52) U.S. Cl.
CPC .................. *B64C 13/042* (2018.01)
(58) Field of Classification Search
CPC .............. B64C 13/042; B64C 13/0421; G05G 2009/04762; G05G 2009/04703; G01L 5/223; Y10T 74/20762
See application file for complete search history.

(56) References Cited

U.S. PATENT DOCUMENTS

| | | | |
|---|---|---|---|
| 1,798,724 A | 3/1931 | Chalmers | |
| 2,051,124 A * | 8/1936 | Aull | F16K 1/482 |
| | | | 74/548 |
| 2,895,086 A | 7/1959 | Pettit | |
| 3,320,825 A * | 5/1967 | Gillberg | F16K 1/32 |
| | | | 74/548 |
| 4,811,921 A | 3/1989 | Whitaker et al. | |
| 2011/0303038 A1 | 12/2011 | Peterson et al. | |
| 2013/0256463 A1 | 10/2013 | Antraygue | |
| 2018/0002893 A1 * | 1/2018 | Heinzmann | E02F 9/2012 |

FOREIGN PATENT DOCUMENTS

| | | | |
|---|---|---|---|
| FR | 2312070 A1 | 12/1976 | |
| GB | 1000439 A * | 8/1965 | |
| WO | WO-2009016361 A2 * | 2/2009 | B64C 13/04 |

* cited by examiner

*Primary Examiner* — Daniel D Yabut
(74) *Attorney, Agent, or Firm* — Bachman & LaPointe, P.C.

(57) ABSTRACT

Plinth system (1) for a control stick (51) for controlling an aircraft having a plinth flange (3) includes a tubular receiving means (7) and a plinth nut (5) which at least partially encloses the receiving means of the plinth flange (3), wherein the plinth nut (5) comprises an interface (11) for fastening a knurled nut (41).

19 Claims, 4 Drawing Sheets

MECHANICAL GRIP INTERFACE FOR ACTIVE SIDE STICK

BACKGROUND OF THE INVENTION

The disclosure relates to a plinth system for a control stick for controlling an aircraft, a device for controlling an aircraft and a method for producing a plinth system for a control stick for controlling an aircraft.

PRIOR ART

Control devices for aircraft are known from the prior art. Control devices known in the art comprise a control stick which is fastened to a plinth of the control device. The control stick is used, for example, in order to control the aircraft's steering systems. In this case, a pilot can, in particular, exert a force on the control stick, for example a force in the direction of a pitch axis or a roll axis. The effect of the force on the control stick is determined in the control device and can be used to control the aircraft. The control stick may have further control possibilities, for example control buttons which allow the operation of further aircraft functions on the control stick.

However, control devices known in the art exhibit limitations, particularly in relation to the ergonomics of the control device or in relation to the compatibility of control sticks and plinths.

SUMMARY OF THE INVENTION

The problem addressed by the disclosure is that of specifying plinth systems for a control stick for controlling an aircraft which are improved by comparison with the prior art. In particular, plinth systems should be specified which provide improved ergonomics or greater compatibility of control sticks and plinths. Furthermore, a problem addressed by the invention is that of specifying a device for controlling an aircraft and a method for producing a plinth system.

The problem is solved by a plinth system as disclosed herein and a device and a method also as disclosed herein and according to the dependent claims.

According to one aspect, a plinth system for a control stick for controlling an aircraft is specified which has a plinth flange comprising a tubular receiving means and a plinth nut which at least partially encloses the receiving means of the plinth flange, wherein the plinth nut comprises an interface for fastening a knurled nut.

According to a further aspect, a device for controlling an aircraft is specified which comprises a drive device and a plinth system according to embodiments described herein, the plinth flange of the plinth system being fastened to the drive device.

According to yet another aspect, a method is specified for producing a plinth system for a control stick for controlling an aircraft, in particular according to embodiments described herein, involving the sliding-on of a plinth nut over a tubular receiving means of a plinth flange, and securing of the plinth nut to the plinth flange.

"Aircraft" in this case should be understood to mean, in particular, genuine aircraft or aircraft simulators. A control stick in this case may, in particular, be set up for use as a center stick in front of a pilot's seat or for use as a side stick, for example as an active side stick. The control stick in this case can be understood to mean a "joystick" for example.

With typical embodiments, the plinth system is set up to be connected to a control stick. In the case of a plinth system which is connected to a control stick, a vertical axis of the plinth system may, in particular, correspond at least substantially to a control stick vertical axis. In this case, expressions such as "axially" or "radially" should be particularly understood in relation to the vertical axis of the plinth system.

In typical embodiments, the plinth system comprises a plinth flange which is in particular set up for fastening the plinth system. The plinth flange typically comprises a plinth base, for example a flange. The plinth base is typically set up to fasten the plinth flange or the plinth system to a drive device, for example to a drive device of a device for controlling an aircraft. In particular, the plinth base may be set up to connect to a drive housing of a drive of the drive device. In embodiments, the plinth base has base openings, for example base openings formed in an axial direction, for fastening the plinth base to a drive device. In a cross section to the vertical axis, the plinth base may have an at least substantially square cross section or an at least substantially round cross section, for example.

The plinth flange typically comprises a tubular receiving means which is particularly set up to receive a grip connector. The tubular receiving means typically extends along the vertical axis of the plinth system. The plinth flange typically has a continuous opening through the tubular receiving means and the plinth base.

In typical embodiments, the plinth flange comprises at least one plinth projection, in particular at least two plinth projections, in the direction of the control stick to prevent torsion of a grip adapter plate. In particular, the at least one plinth projection is provided on the tubular receiving means of the plinth flange, for example axially in the direction of the control stick. The at least one plinth projection may be configured as a lug, a pin or a projection having a circular segment-shaped cross section to the vertical axis, for example.

The plinth nut of the plinth system typically comprises an interface for fastening a grip nut. In particular, the plinth nut is set up to connect to the grip nut. In typical embodiments, the interface of the plinth nut is designed as an external thread of said plinth nut. In particular, the external thread is configured radially outwardly on the plinth nut. The plinth nut may have radially outwardly flattened areas for tightening the plinth nuts using a jaw wrench.

In typical embodiments, the plinth nut is connected to the plinth flange in a form-fitting manner. The plinth nut is typically mounted on the plinth flange so as to be rotatable about the tubular receiving means of the plinth flange. For example, the plinth nut may be mounted on the plinth flange in a sliding manner. Typically, the plinth nut is secured to the plinth flange, in particular secured in such a manner that the plinth nut is prevented from slipping off in the direction of the control stick.

In embodiments the tubular receiving means of the plinth flange has a groove in the circumferential direction, wherein securing segments of the plinth system are partially arranged in the groove and form a stop for the plinth nut in the direction of the control stick. In particular, the securing segments secure the plinth nut to prevent it from slipping off in the direction of the control stick. The groove is typically configured radially outwardly on the tubular receiving means. The groove may, in particular, be configured as an annular groove about the tubular receiving means. The securing segments may form a stop for the plinth nut in an axial direction. In embodiments, the securing segments for a knurled nut may form a further stop in the direction of the plinth base. In particular, the plinth nut may be mounted on the tubular receiving means of the plinth flange and on the securing segments, for example mounted in a sliding manner.

The securing segments are typically designed as a split securing ring. In embodiments, the securing segments have a securing segment anti-torsion device, in particular at least one axially configured pin or one axially configured lug. In embodiments, the securing segment anti-torsion device may secure the securing segments to prevent torsion in respect of the plinth flange. In further embodiments, the securing segment anti-torsion device may secure the securing segments to prevent torsion in respect of the plinth nut or knurled nut.

In embodiments, the plinth nut may have a plinth nut groove. The plinth nut groove is typically set up to receive a locking wire. The plinth nut groove may be arranged radially outwardly on the plinth nut, for example. In embodiments, the plinth nut has fastening openings for fastening the locking wire, for example fastening openings in the circumferential direction about the vertical axis. The locking wire is particularly used for the additional securing of the plinth nut and knurled nut to one another.

In typical embodiments, the plinth system comprises a grip connector which is received at least partially in the tubular receiving means of the plinth flange and has a radially projecting connector flange. The connector flange typically has on the side of the connector flange facing the control stick at least one connector anti-torsion element to prevent torsion of the grip connector in respect of a grip adapter plate. The connector anti-torsion element may, in particular, comprise at least one lug or at least one depression. The connector flange of the grip connector typically lies on a first axial plinth flange end face of the plinth flange. The first axial plinth flange end face particularly forms an axial stop for the grip connector. The first axial plinth flange end face and a second axial plinth flange end face may form a step in the radial direction. In particular, the second axial plinth flange end face is configured radially outside the first axial plinth flange end face. For example, the connector flange may lie on the first axial plinth flange end face in an axial direction. The connector flange may be configured axially, at least substantially flush with the second axial plinth flange end face, in the direction of the control stick. The step may be arranged radially in such a manner that the grip connector, in particular the connector flange, exhibits play in the radial direction.

The grip connector typically has electrical contacts. The electrical contacts may be set up to make contact with other electrical contacts of the control stick. The other electrical contacts of the control stick may for example be connected to other control elements of the control stick, for example to a control button, a control switch or a trigger. The grip connector may have further electrical connection contacts, for example for connecting the grip connector by cable to a control mechanism of an aircraft.

In embodiments, the plinth system comprises a grip adapter plate which is set up to be arranged between the plinth flange and the control stick, wherein the grip adapter plate comprises on a first adapter side of the grip adapter plate facing the control stick at least one grip alignment lug for preventing torsion of the control stick in respect of the grip adapter plate and the plinth flange. The grip adapter plate typically encloses the grip connector at least partially. For example, the grip adapter plate is at least substantially annular in design.

In typical embodiments, the grip adapter plate has at least one recess for preventing torsion in respect of the plinth flange, in particular for engagement with at least one plinth projection of the plinth flange. The at least one recess may be radially outwardly configured, for example. The at least one recess may be designed to match the at least one plinth projection. For example, the recess may have a straight portion radially outwardly which, in particular, matches a plinth projection, wherein the plinth projection has a circular segment-shaped cross section in the cross section to the vertical axis, for example.

The grip adapter plate may lie on a second axial plinth flange end face of the plinth flange. In embodiments, the first axial plinth flange end face on which the grip connector rests, for example, may be configured radially within the second axial plinth flange end face. The first axial plinth flange end face and the second axial plinth flange end face may be configured in an axially offset manner and, for example, form a step in the radial direction.

In typical embodiments, the grip adapter plate comprises at least one adapter anti-torsion element for preventing torsion of the grip connector in respect of the plinth flange on a second adapter side of the grip adapter plate which faces the plinth flange. In particular, the adapter anti-torsion element may be configured to be at least substantially suitable for engagement with the connector anti-torsion element. The adapter anti-torsion element may comprise at least one lug or at least one depression, for example.

The grip adapter plate is typically designed in a control stick-specific manner. In particular, the grip adapter plate may be produced for a specific type of control stick. For example, the grip alignment lug may be arranged in a control stick-specific manner, for example arranged in a control-stick specific manner in the circumferential direction about the vertical axis. In typical embodiments, the grip adapter plate can define an alignment of the control stick, in particular an alignment about the vertical axis. The alignment of the control stick in this case may in particular relate to a zero alignment or starting alignment, for example in embodiments in which the control stick is configured to be rotatable about the vertical axis. For example, the alignment of the control stick may be adjustable in an angle range about the vertical axis of at least 5 degrees, in particular of at least 10 degrees or at least 20 degrees, or of maximum 60 degrees, in particular of maximum 50 degrees or maximum 40 degrees, for example in an angle range of 30 degrees.

In embodiments, an alignment of the grip connector is adapted to the alignment of the control stick, for example through the arrangement of the adapter anti-torsion element of the grip adapter in the circumferential direction about the vertical axis. In embodiments, the alignment of the control stick may be adapted in an aircraft-specific or cockpit-specific manner, for example. One advantage of embodiments described herein may be that the ergonomics are improved, in particular when the plinth system is used with a side stick.

In typical embodiments, the plinth system comprises a knurled nut having a fastening interface for fastening the knurled nut to the plinth nut, in particular for connecting the fastening interface of the knurled nut to the interface of the plinth nut. In particular, the fastening interface of the knurled nut is configured radially internally on the knurled nut. The fastening interface of the knurled nut is typically configured as a fastening internal thread. The knurled nut may have radially external flattened areas for tightening the knurled nut using a jaw wrench.

In typical embodiments, the knurled nut comprises a grip interface for fastening the control stick to the knurled nut. The grip interface is typically configured as a grip internal thread, in particular radially internally on the knurled nut. The fastening internal thread typically has an opposing thread direction to the grip internal thread—for example a left-hand thread or right-hand thread. The grip interface is typically arranged axially in the direction of the control stick in relation to the fastening interface.

In other typical embodiments, the grip interface may be configured as part of a bayonet connector for connecting to a control stick or as part of a toggle joint lock for connecting to a control stick or as a knurled nut external thread for a cap nut for fastening a control stick.

In embodiments, the knurled nut, in particular the grip interface, has a control stick-specific design. In particular, a grip internal thread for connecting the plinth system to a control stick may be adapted to a control stick external thread. For example, the grip internal thread may be adapted to a thread diameter, to a thread type or to a thread length of the control stick external thread. In typical embodiments, the plinth system is set up through adjustment of the knurled nut and the grip adapter plate for use with different types of control sticks.

The interface of the plinth nut is typically connected to the fastening interface of the knurled nut, wherein the knurled nut and the plinth nut are mounted so as to be jointly rotatable about the tubular receiving means of the plinth flange. In particular, an external thread of the plinth nut is screwed to the fastening internal thread of the knurled nut. Typically, the plinth nut and the knurled nut which are connected to one another are mounted so as to be jointly rotatable about the tubular receiving means of the plinth flange. In particular, the plinth nut and the knurled nut are mounted rotatably on the tubular receiving means and on securing segments of the plinth system. For example, the plinth nut and the knurled nut are mounted in a sliding manner.

In typical embodiments, the plinth system is set up to connect to a control stick, in particular by screwing a grip internal thread of the knurled nut to a control stick external thread of the control stick, for example by jointly rotating the plinth nut and knurled nut which are screwed to one another. Where the control stick is screwed to the plinth system, the plinth nut and knurled nut which are connected to one another can be axially supported on the securing segments.

In typical embodiments, the plinth flange is configured as a force sensor, wherein the force sensor is set up for the measurement of forces acting on the control stick in the direction of at least two axes. The at least two axes typically comprise a roll axis or a pitch axis, in particular a roll axis and a pitch axis. In particular, the force sensor is set up to measure forces, in particular force components or bending moments, in directions perpendicular to the vertical axis.

The plinth flange, in particular the force sensor, typically has a tapered region, in particular a region tapered in cross section in the direction of, or along, the vertical axis. The force sensor typically has sensors, in particular resistance strain gauges, in the tapered region of said force sensor for measuring forces on the control stick. For example, the tubular receiving means comprises the tapered region, in particular in an axial region adjacent to the plinth base. The sensors may be set up for determining forces exerted on the control stick, in particular for determining strains or stresses. For example, the sensors may be set up to determine forces or force components in the direction of the pitch axis or the roll axis. The sensors may be provided with redundancy, in particular at least double redundancy, for each axis, for example. In typical embodiments, the sensors of the force sensor are covered by a sensor cover of the plinth system. The sensor cover may be fastened to the plinth base, for example.

Typical embodiments of a device for controlling an aircraft comprise a drive device and a plinth system according to embodiments described herein. The device is typically set up in such a manner that the control stick is movable. In particular, the control stick is movable about at least one axis, for example about a roll axis or a pitch axis, optionally about a yaw axis. In particular, axes are oriented at right angles to one another. The drive device is typically set up to move the control stick or to exert a driving force of the drive device on the control stick. In embodiments, the drive device is configured as an active system, for example as an active system of an active side stick. The drive device typically has at least one drive, in particular two or three drives, for example a first drive and a second drive. Typically, the at least one drive comprises an electric drive with an electric motor. The at least one drive may comprise a gearing mechanism. An active system determines, in particular, the position or the alignment of the control stick by means of position sensors, for example. An active system may be set up to supply an electronically regulated force feedback, for example. The force feedback may provide a pilot with a report on the control reserves available in a particular control direction, for example, in particular until a control limit is reached.

In other typical embodiments, the drive device is configured as a passive system, wherein a driving force of the drive device is supplied by at least one spring, for example.

In other typical embodiments, a device for controlling an aircraft may be designed as a rigid system, in particular without a drive device. For example, the plinth system may be fastened to an immovable plinth platform, for example a plinth platform of an aircraft cockpit or a flight simulator, wherein the forces exerted on the control stick are, in particular, measured by a force sensor of the plinth system.

In typical embodiments of the device, the plinth flange of the plinth system is fastened to the drive device, for example screwed to the drive device. In particular, the plinth flange may be screwed to the drive device through base openings in the plinth base.

Typical embodiments of the device comprise a control stick which is connected to the plinth system. In particular, a control stick interface, for example a control stick external thread, is connected to a grip interface of the knurled nut, for example to a grip internal thread. Electrical contacts of the grip connector may make contact with other electrical contacts of a control stick connector of the control stick. A grip alignment lug of the grip adapter plate may engage with a control stick recess in the control stick, for example, and define an alignment of the control stick.

Typical methods of producing a plinth system, in particular a plinth system according to the embodiments described herein, comprise a sliding-on of a plinth nut over a tubular receiving means of a plinth flange. In particular, the plinth nut is slipped on in the direction of a plinth base of the plinth flange. The plinth nut is typically slid on in such a manner that the plinth nut encloses the tubular receiving means at least partially.

Typical methods comprise a securing of the plinth nut to the plinth flange. The plinth nut is typically secured in an axial direction, in particular in the direction of the control stick. For example, the plinth nut is axially secured to prevent slipping-off from the tubular receiving means. The securing typically involves an insertion of securing segments into a groove in the plinth flange. In particular, a stop for the plinth nut can be formed in the direction of the control stick by inserting securing segments.

Typical methods comprise an insertion of a grip connector into the tubular receiving means of the plinth flange. Typical methods comprise an arrangement of a grip adapter plate on the plinth flange. In particular, the grip adapter plate is arranged in such a manner that said grip adapter plate is secured by at least one plinth projection of the plinth flange to prevent torsion in respect of said plinth flange.

Typical embodiments comprise a fastening of a knurled nut to the plinth nut, for example by connecting an interface of the plinth nut to a fastening interface of the knurled nut. In particular, the fastening can take place by screwing a fastening internal thread of the knurled nut to an external thread of the plinth nut, wherein the knurled nut and the plinth nut, in particular, are screwed with a defined torque. The plinth nut and the knurled nut can be secured using locking wire.

Typical embodiments may offer the advantage, compared with the prior art, that compatibility between the plinth and control stick is improved. In particular, the plinth system may offer the advantage that at least part of the plinth system can be used for different types of control sticks which are available on the market. For example, the plinth system may be adapted for use with a type of control stick by adjusting the grip adapter plate or the knurled nut. Embodiments may offer the advantage that the plinth system can be adapted, for example to an aircraft cockpit. By way of example, an alignment of the control stick, in particular an alignment about the vertical axis, can be adapted. In aircraft with control sticks, in particular with a side stick, the ergonomics, for example, can be improved by embodiments described herein.

BRIEF DESCRIPTION OF THE DRAWINGS

Further advantages and features of preferred embodiments of the invention are explained below with the help of the attached drawings, wherein the figures show.

DETAILED DESCRIPTION

Typical embodiments are described below with the help of the figures, wherein the invention is not limited to the exemplary embodiments, but the scope of the invention is instead determined by the claims.

When describing the figures, the same reference numbers are used for the same, or similar, parts. Features which have already been described in connection with other figures are not described again for the sake of transparency. In the figures, in some cases features which are depicted multiple times are not each provided with a reference number for the sake of transparency, for example the electrical contacts (reference number 29 in FIG. 1).

Figure 1:
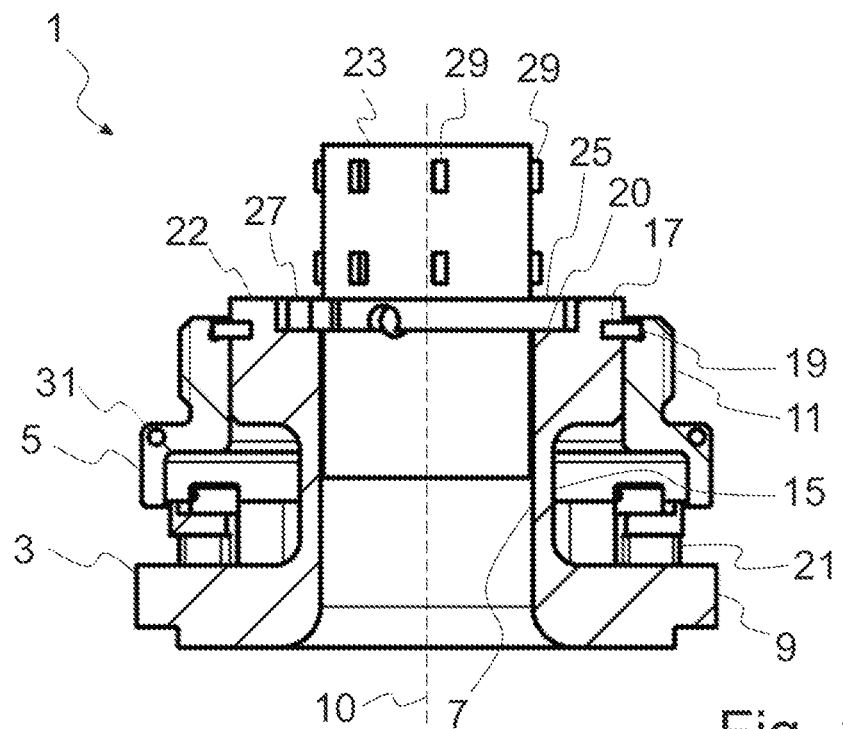
FIG. 1 a schematic sectional view of a typical plinth system.

FIG. 1 shows a schematic sectional view of a typical plinth system 1. The plinth system 1 comprises a plinth flange 3 with a plinth base 9 and a tubular receiving means 7. The plinth flange 3, in particular the tubular receiving means 7 of the plinth flange 3, extends along a vertical axis 10 of the plinth system 1. The tubular receiving means 7 comprises a tapered region 15 which is arranged axially in a region of the tubular receiving means 7 adjacent to the plinth base 9. The plinth flange 3 has plinth projections (concealed in FIG. 1, see for example plinth projections 13 in FIG. 4) axially in the direction of the control stick to prevent torsion of a grip adapter plate.

The plinth flange 3 is configured as a force sensor in FIG. 1. Sensors (not shown), resistance strain gauges in the embodiment in FIG. 1, are arranged in the tapered region 15 of the plinth flange 3. The sensors are set up to determine forces which are applied to a control stick fastened to the plinth system 1, for example by a pilot's hand when controlling an aircraft. In particular, the sensors determine forces in the direction of a roll axis and a pitch axis which are oriented at right angles to the vertical axis 10 and at right angles to one another. The sensors are covered by a sensor cover 21 and outwardly protected.

The plinth system 1 comprises a plinth nut 5 which encloses the tubular receiving means 7 in the circumferential direction about the vertical axis 10. The plinth nut 5 has a radially outward interface 11 which is set up to connect to a knurled nut. In FIG. 1 the interface 11 is configured as an external thread of the plinth nut 5. The plinth nut 5 has a fastening opening 31 for fastening a locking wire.

The plinth nut 5 in FIG. 1 is secured by securing segments 19 to prevent slipping-off from the tubular receiving means 7. The securing segments 19 are partially received in a groove 17 in the plinth flange 3. The groove 17 is configured as an annular groove in the circumferential direction about the tubular receiving means 7 in FIG. 1, for example.

In FIG. 1 a grip connector 23 of the plinth system 1 is partially received in the tubular receiving means 7 of the plinth flange 3. The grip connector 23 has a radially projecting connector flange 25. The connector flange 25 lies axially on a first axial plinth flange end face 20 of the plinth flange 3. The first axial plinth flange end face 20 forms a step in the radial direction with a second axial plinth flange end face 22. The connector flange 25 is configured flush with the second axial plinth flange end face 22 axially in the direction of the control stick. The connector flange 25 has a connector anti-torsion element 27 to prevent torsion of the connector flange 25 in respect of a grip adapter plate. In FIG. 1, the connector anti-torsion element 27 is configured as an axial depression in the connector flange 25 in the direction of the plinth base 9. The grip connector 23 has electrical contacts 29 for making contact with other electrical contacts of a control stick.

Figure 2:
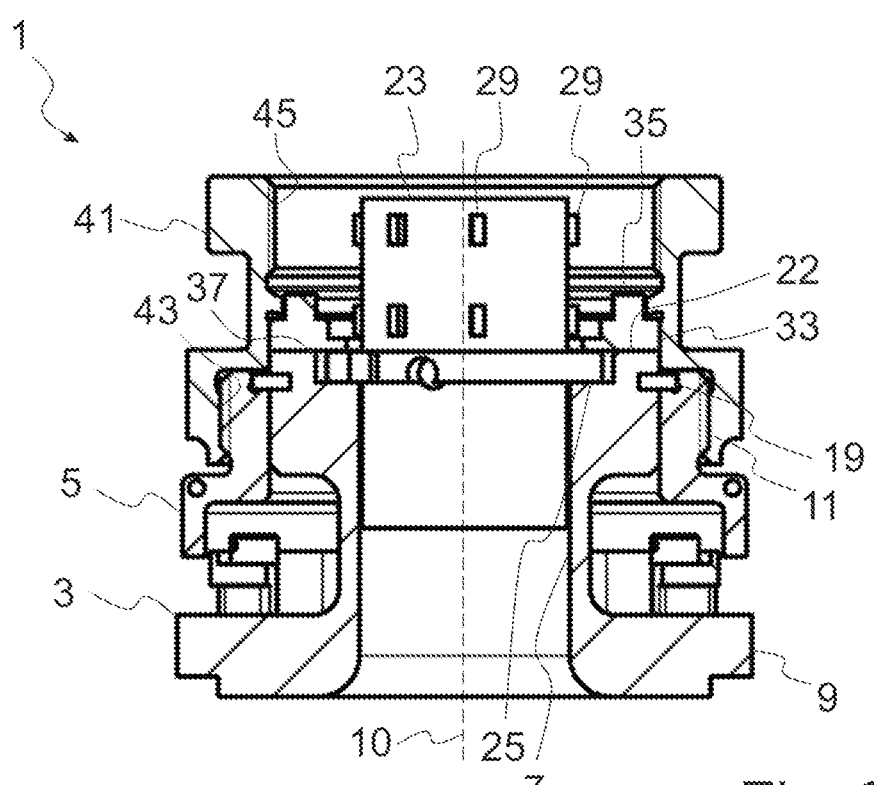
FIG. 2 a schematic sectional view of a further embodiment of a typical plinth system.

FIG. 2 shows a schematic sectional view of a plinth system 1, wherein the plinth system 1 in FIG. 2 particularly comprises a grip adapter plate 33 and a knurled nut 41. The grip adapter plate 33 is annular in design and encloses the grip connector 23 in the circumferential direction about the vertical axis 10. The grip adapter plate 33 lies axially in the direction of the plinth base 9 partially on the connector flange 25 of the grip connector 23 and partially on the second axial plinth flange end face 22. The grip adapter plate 33 has an adapter anti-torsion element 37 which, along with the connector anti-torsion element 27, prevents torsion of the grip connector 23 in respect of the grip adapter plate 33.

In FIG. 2 the adapter anti-torsion securing element 37 is configured as a lug which engages in the axial direction with the connector anti-torsion element 27 configured as an axial depression in the connector flange 25.

The grip adapter plate 33 comprises grip alignment lugs 35 for preventing said control stick from rotating in respect of the grip adapter plate 33 axially in the direction of the control stick. The grip adapter plate 33 has recesses to prevent torsion of said grip adapter plate 33 in respect of the plinth flange 23, said recesses being designed to match the plinth projections of the plinth flange 3.

By arranging the anti-torsion devices of the grip adapter plate in the circumferential direction about the vertical axis, in particular the at least one grip alignment lug, the at least one adapter anti-torsion element or the at least one recess, an alignment of the control stick about the vertical axis, for example, can be set. In particular, by arranging the at least one recess, the alignment of the grip adapter plate about the vertical axis can be fixed in respect of the plinth flange. By arranging the at least one grip alignment lug, the alignment of the control stick in respect of the grip adapter plate can be predefined, for example. By arranging the at least one anti-torsion element, an alignment of the grip connector about the vertical axis, in particular the electrical contacts of the grip connector, can be predefined in respect of the grip adapter plate. For example, the grip adapter plate, in particular the anti-torsion devices of the grip adapter plate, can be set up in such a manner that the alignment about the vertical axis of the electrical contacts of the grip connector is adapted to the alignment of the control stick about the vertical axis. In this case, a fixing or predefining of an alignment about the vertical axis should, in particular, not be regarded in absolute terms, but relative to the grip adapter plate or to the plinth flange, for example. In the case of embodiments, the control stick may be configured to be rotatable about the vertical axis along with the plinth flange.

The plinth system 1 comprises a knurled nut 41 in FIG. 2. The knurled nut 41 has a fastening interface 43, in FIG. 2 a fastening internal thread, for connecting to the interface 11 of the plinth nut 5. For example, the fastening internal thread of the knurled nut 41 in FIG. 2 is screwed to the external thread of the plinth nut 5. The fastening internal thread is configured as a left-handed thread, for example. The knurled nut 41 and the plinth nut 5 are mounted in a jointly rotatable manner about the vertical axis 10 on the plinth flange 3 and the securing segments 19.

The knurled nut 41 has a grip internal thread 45 in FIG. 2 for connecting the knurled nut 41 to a control stick. The grip internal thread 45 is arranged axially in the direction of the control stick in relation to the fastening interface 43. The grip internal thread 45 is set up to screw to a control stick external thread of the control stick. The grip internal thread 45 is designed as a right-handed thread, for example.

Figure 3:
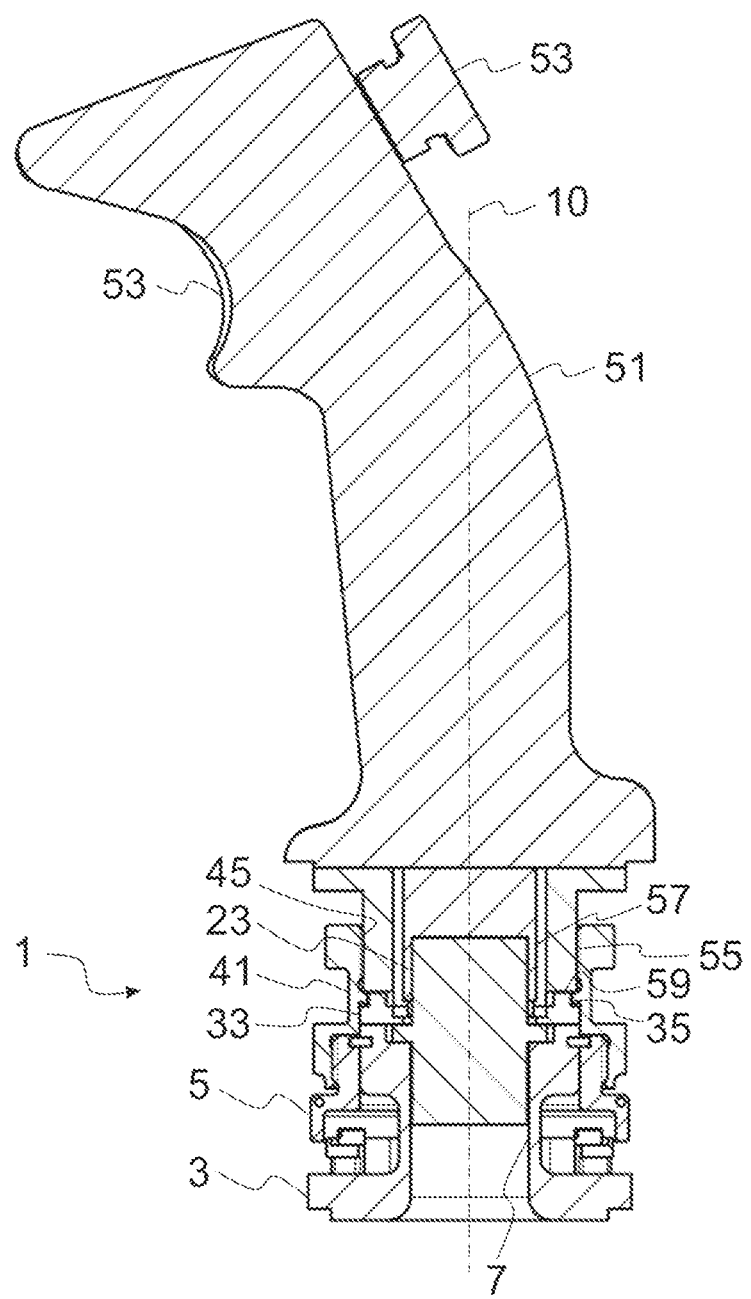
FIG. 3 a schematic sectional view of a typical plinth system and a control stick.

FIG. 3 shows a sectional view of a plinth system 1 with a control stick 51 fastened to said plinth system 1. The control stick 51 has a control stick external thread 55 which is screwed to the grip internal thread 45 of the knurled nut 41. The control stick 51 comprises a control stick connector 57 with other electrical contacts. The other electrical contacts are connected to other control elements 53, in FIG. 3 to a control switch and a trigger. The control stick connector 57 encloses the grip connector 23 of the plinth system 1, wherein the other electrical contacts of the control stick 51 make contact with the electrical contacts 29 of the grip connector 23.

In order to control an aircraft, a force can be applied by a pilot to the control stick 51, for example, in particular in a direction perpendicular to the vertical axis 10, for example about the pitch axis or the roll axis. The force can be transmitted by the plinth system 1 to the plinth flange 3. In particular, the force may be determined as a strain or stress by sensors, for example resistance strain gauges, in the tapered region 15 of the tubular receiving means 7 and used for control purposes.

Figure 4:
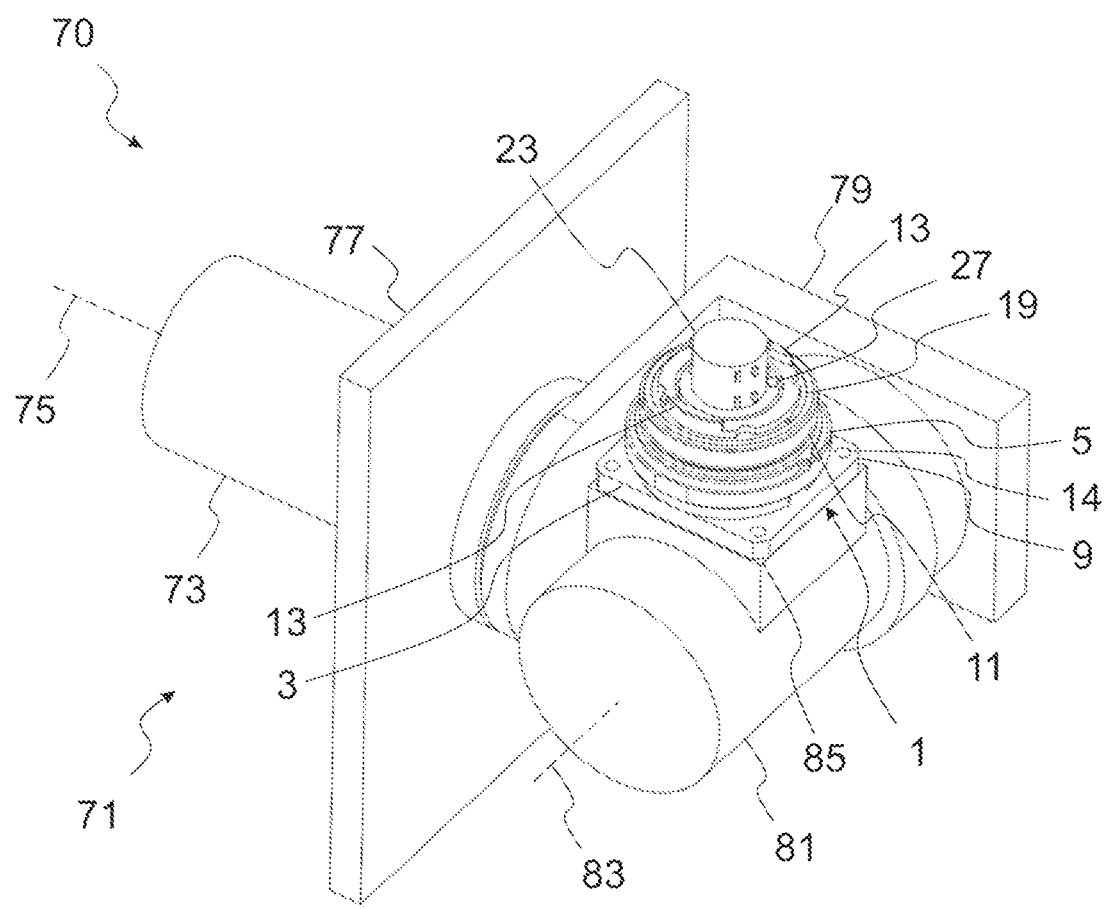
FIG. 4 a schematic view of a device for controlling an aircraft.

FIG. 4 shows a schematic view of a device 70 for controlling an aircraft. The device 70 comprises a drive device 71. The drive device 71 is set up to provide an electronically controlled force feedback for the control of an aircraft by a pilot. The drive device 71 comprises a first drive 73. A first stator of the first drive 73 is rigidly connected to a housing 77, for example. A first shaft of the first drive 73 can be rotated about the first axis 75. A guide element 79 of the drive device 71 is arranged on the first shaft, said guide element rotating with the first shaft about the first axis 75. A second drive 81 of the drive device 71 is arranged on the guide element 79. The second drive 81 moves with the guide element 79. A second stator of the second drive 81 and a second shaft of the second drive 81 are rotatable relative to one another about a second axis 83. The second drive 81 has a platform 85 for fastening a plinth system 1. In FIG. 4 the platform 85 is rigidly connected to the second stator. The second shaft is rigidly connected to the guide element 79. In other embodiments, the second shaft may be rigidly connected to the platform, for example, and the second stator rigidly connected to the guide element.

In FIG. 4 the plinth system 1 comprises a plinth flange 3, a plinth nut 5, securing segments 19 and a grip connector 23. The plinth base 9 of the plinth flange 3 has base openings 14. The plinth base 9 is screwed to the platform 85 of the drive device 71 through the base openings 14. The plinth flange 3 comprises plinth projections 13 to prevent torsion of a grip adapter plate in respect of the plinth flange 3, said plinth projections being axial in the direction of the control stick, for example on an axial plinth flange end face 22.

Figure 5:
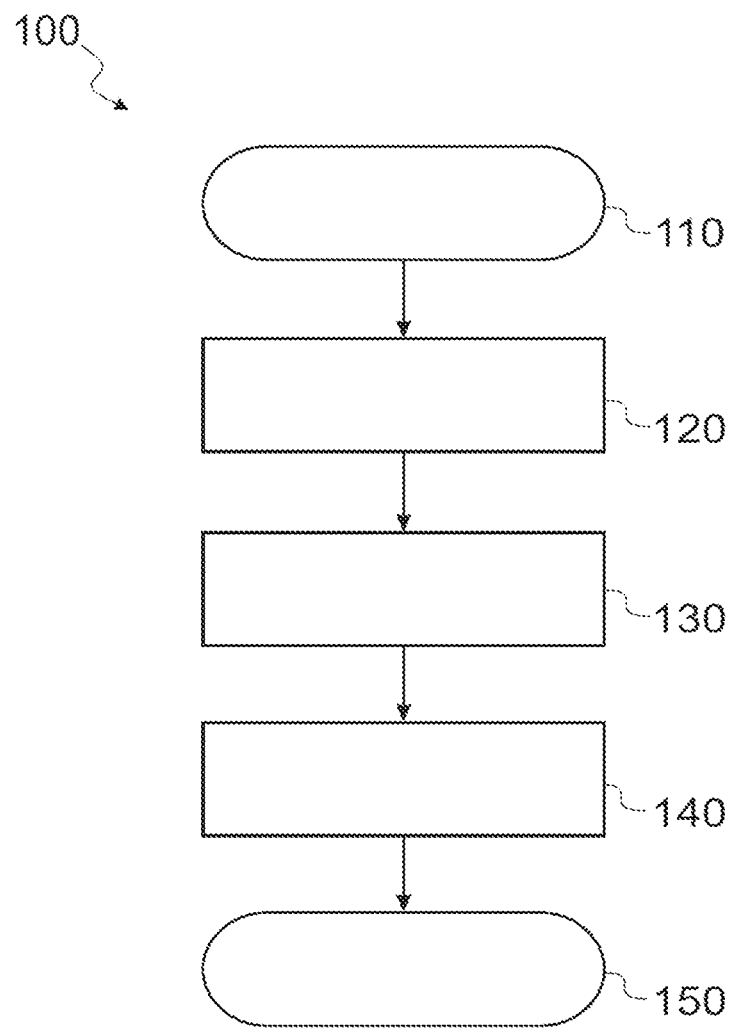
FIG. 5 a schematic depiction of a typical method for producing a plinth system.

FIG. 5 shows schematically a typical embodiment of a method 100 for producing a plinth system. The method 100 comprises at 110 a sliding-on of a plinth nut over a tubular receiving means of a plinth flange in the direction of a plinth base of the plinth flange.

At 120 the plinth nut is secured to the plinth flange. The securing comprises an insertion of securing segments into a groove of the plinth flange to form a stop for the plinth nut in the direction of the control stick.

At 130 the method 100 comprises an insertion of a grip connector into the annular receiving means of the plinth flange. At 140 a grip adapter plate is arranged on the plinth flange, wherein said grip adapter plate is specifically produced for a control stick and specifically for the alignment of the control stick. The arrangement comprises an engagement of plinth projections of the plinth flange with recesses of the grip adapter plate. The arrangement comprises an engagement of an adapter anti-torsion element of the grip adapter plate with a connector anti-torsion element of the grip connector.

At 150 the method 100 comprises a fastening of a grip nut which is specifically produced for the control stick to the plinth nut by screwing a fastening internal thread of the grip nut to an external thread of the plinth nut with a defined torque.

The invention claimed is:

1. Plinth system (1) for a control stick (51) for controlling an aircraft having
   a plinth flange (3) comprising a tubular receiving means (7) and
   a plinth nut (5) which at least partially encloses the receiving means of the plinth flange (3), wherein the plinth nut (5) comprises an interface (11) for fastening a knurled nut (41), wherein the knurled nut comprises a grip interface for fastening the control stick directly to the knurled nut.

2. Plinth system (1) according to claim 1, wherein the plinth flange (3) comprises at least one plinth projection (13) in the direction of the control stick (51) to prevent torsion of a grip adapter plate (33).

3. Plinth system (1) according to claim 1, wherein the interface (11) of the plinth nut (5) is designed as an external thread of said plinth nut (5).

4. Plinth system (1) according to claim 1, wherein the plinth nut (5) is mounted on the plinth flange (3) so as to be rotatable about the tubular receiving means (7) of the plinth flange (3).

5. Plinth system (1) according to claim 1, wherein the tubular receiving means (7) of the plinth flange (3) has a groove (17) in the circumferential direction and wherein securing segments (19) of the plinth system (1) are partially arranged in the groove (17) and form a stop for the plinth nut (5) in the direction of the control stick (51).

6. Plinth system (1) according to claim 1, comprising a grip connector (23) which is received at least partially in the tubular receiving means (7) of the plinth flange (3) and has a radially projecting connector flange (25), wherein the connector flange (25) has on the side of the connector flange (25) facing the control stick (51) at least one connector anti-torsion element (27) to prevent torsion of the grip connector (23) in respect of a grip adapter plate (33).

7. Plinth system (1) according to claim 1, comprising a grip adapter plate (33) which is set up to be arranged between the plinth flange (3) and the control stick (51), wherein the grip adapter plate (33) comprises on a first adapter side of the grip adapter plate (33) facing the control stick (51) at least one grip alignment lug (35) for preventing torsion of the control stick (51) in respect of the grip adapter plate (33) and the plinth flange (3).

8. Plinth system (1) according to claim 7, wherein the grip adapter plate (33) comprises at least one adapter anti-torsion element (37) for preventing torsion of the grip connector (23) in respect of the plinth flange (3) on a second adapter side of the grip adapter plate (33) which faces the plinth flange (3).

9. Plinth system (1) according to claim 1, wherein the knurled nut (41) has a fastening interface (43) for fastening the knurled nut (41) to the plinth nut (5).

10. Plinth system (1) according to claim 9, wherein the fastening interface (43) of the knurled nut (41) is configured as a fastening internal thread.

11. Plinth system (1) according to claim 9, wherein the knurled nut (41) comprises a grip internal thread (45) for fastening the control stick (51) to the knurled nut (41).

12. Plinth system (1) according to claim 9, wherein the interface (11) of the plinth nut (5) is connected to the fastening interface (43) of the knurled nut (41) and the knurled nut (41) and the plinth nut (5) are mounted so as to be jointly rotatable about the tubular receiving means (7) of the plinth flange (3).

13. Plinth system (1) according to claim 1, wherein the plinth flange (3) is configured as a force sensor and the force sensor is set up for the measurement of forces acting on the control stick (51) in the direction of at least two axes.

14. Plinth system (1) according to claim 13, wherein the force sensor has sensors in a tapered region (15) of said force sensor for measuring forces on the control stick (51).

15. Plinth system (1) according to claim 14, wherein the sensors are resistance strain gauges.

16. Device (70) for controlling an aircraft comprising
a drive device (71); and
a plinth system (1) according to claim 1, wherein the plinth flange (3) of the plinth system (1) is fastened to the drive device (71).

17. Method (100) for producing a plinth system for a control stick for controlling an aircraft according to claim 1, comprising
the sliding-on (110) of a plinth nut over a tubular receiving means of a plinth flange; and
securing (120) of the plinth nut to the plinth flange.

18. Plinth system (1) for a control stick (51) for controlling an aircraft, comprising
a plinth flange (3) comprising a tubular receiving means (7) and
a plinth nut (5) which at least partially encloses the receiving means of the plinth flange (3),
wherein the plinth nut (5) comprises an interface (11) for fastening a knurled nut (41), and wherein the plinth flange (3) comprises at least one plinth projection (13) in the direction of the control stick (51) for engagement with at least one recess of a grip adapter plate (33) to prevent torsion of the grip adapter plate (33).

19. Plinth system (1) for a control stick (51) for controlling an aircraft having
a plinth flange (3) comprising a tubular receiving means (7) and
a plinth nut (5) which at least partially encloses the receiving means of the plinth flange (3),
wherein the plinth nut (5) comprises an interface (11) for fastening a knurled nut (41), wherein the knurled nut comprises a grip interface for fastening the control stick to the knurled nut, and wherein the plinth flange (3) has a radially inwardly tapered area (15), and a sensor arranged in the tapered area (15) for measuring forces on the control stick (51).

* * * * *